United States Patent
Maetaki

(10) Patent No.: US 8,515,272 B2
(45) Date of Patent: Aug. 20, 2013

(54) OPTICAL APPARATUS HAVING OPTICAL ANTI-SHAKE FUNCTION

(75) Inventor: Satoshi Maetaki, Utsunomiya (JP)

(73) Assignee: Canon Kabushiki Kaisha (JP)

(*) Notice: Subject to any disclaimer, the term of this patent is extended or adjusted under 35 U.S.C. 154(b) by 383 days.

(21) Appl. No.: 12/840,569

(22) Filed: Jul. 21, 2010

(65) Prior Publication Data

US 2011/0019986 A1    Jan. 27, 2011

(30) Foreign Application Priority Data

Jul. 23, 2009 (JP) .................. 2009-171735

(51) Int. Cl.
*G03B 17/00* (2006.01)
*H04N 5/225* (2006.01)

(52) U.S. Cl.
USPC .......................... 396/55; 348/208.5

(58) Field of Classification Search
USPC ........................................... 396/55
See application file for complete search history.

(56) References Cited

U.S. PATENT DOCUMENTS

| | | | |
|---|---|---|---|
| 3,424,513 A * | 1/1969 | Lotspeich | 359/489.14 |
| 5,140,462 A | 8/1992 | Kitagishi | |
| 5,657,080 A * | 8/1997 | Sekine | 348/208.5 |
| 5,883,733 A * | 3/1999 | Hwang | 359/307 |
| 5,982,421 A * | 11/1999 | Inou et al. | 348/208.5 |
| 7,580,619 B2 * | 8/2009 | Ootsuka et al. | 396/55 |
| 7,639,428 B2 * | 12/2009 | Kato et al. | 359/666 |
| 8,014,061 B2 * | 9/2011 | Imai et al. | 359/319 |

FOREIGN PATENT DOCUMENTS

| | | |
|---|---|---|
| JP | 2-168223 A | 6/1990 |
| JP | 8-152504 A | 6/1996 |
| JP | 2001-290183 A | 10/2001 |
| JP | 2003-295250 A | 10/2003 |
| JP | 2004-061910 A | 2/2004 |
| JP | 2007127756 A | 5/2007 |
| JP | 2008-085960 A | 4/2008 |
| JP | 2008185918 A | 8/2008 |

OTHER PUBLICATIONS

Yagi, "KTN Crystals Open Up New Possibilities and Application", NTT Technical Review vol. 7 No. 12 Dec. 2009.*
Japanese Interrogation issued in Japanese counterpart application No. JP2009-171735, issued Nov. 13, 2012.

* cited by examiner

*Primary Examiner* — Clayton E Laballe
*Assistant Examiner* — Leon W Rhodes, Jr.
(74) *Attorney, Agent, or Firm* — Rossi, Kimms & McDowell LLP

(57) ABSTRACT

An optical apparatus of the present invention includes shake detectors 25p and 25y which detect a shake, electro-optic elements eo1 and eo2 which constitute a part of the optical system and change refractive-index distributions by an electro-optic effect in accordance with an applied voltage, and a drive unit 23 which applies a voltage to the electro-optic element so as to reduce an image blur detected by the shake detectors.

7 Claims, 9 Drawing Sheets

OPTICAL APPARATUS HAVING OPTICAL ANTI-SHAKE FUNCTION

BACKGROUND OF THE INVENTION

1. Field of the Invention

The present invention relates to an optical apparatus having an optical anti-shake function such as a camera, an interchangeable lens, or a telescope, and more particularly to an optical apparatus which realizes the optical anti-shake function using an electro-optic element.

2. Description of the Related Art

In order to reduce an image blur caused by a shake such as a hand shake, previously, an optical anti-shake apparatus which deflects luminous flux heading to an image plane by shifting a lens or changing an apex angle of a variable angle prism has been proposed (see Japanese Patent Laid-open Nos. 2004-61910 and H2-168223). Furthermore, an optical anti-shake apparatus which uses a liquid crystal inclusion element in which a refractive-index variable liquid crystal is included in a wedge-shaped space and a voltage applied to the liquid crystal inclusion element is controlled to uniformly changes the refractive index of the liquid crystal to deflect the luminous flux is proposed (Japanese Patent Laid-open No. H8-152504).

Generally, a frequency range of a hand shake generated by holding an optical apparatus with hands to take or observe an image by a user is around 0.1 to 10 Hz, and the hand shake can be well corrected by the optical anti-shake apparatus disclosed in Japanese Patent Laid-open Nos. 2004-61910 and H2-168223. However, a shake generated in a tripod to which an optical apparatus is attached to take an image or the like sometimes has a frequency of 4 to 35 Hz higher than that of the hand shake. In addition, when the optical apparatus is used on a mobile object such as a vehicle, a shake in a wide frequency range of a few Hz to a few hundreds of Hz is generated.

However, in the optical anti-shake apparatus disclosed in Japanese Patent Laid-open Nos. 2004-61910 and H2-168223, because a mechanical drive of the lens or the variable angle prism is necessary, it is difficult to sufficiently correct the image blur of a frequency beyond the frequency range of the hand shake.

Furthermore, in the optical anti-shake apparatus disclosed in Japanese Patent Laid-open No. H8-152504, because a response speed of the refractive-index variable liquid crystal is around 10 Hz, it is not suitable for the image shake in a high-frequency range of around a few hundreds of Hz. In addition, because the refractive-index variable liquid crystal is included in a wedge-shaped manner, the luminous flux is deflected even if it is not in an anti-shake state. Therefore, in the same optical cross section, an anti-shake state and a non-anti-shake state cannot be switched only by one liquid crystal inclusion element, and a combination of at least two liquid crystal inclusion elements is necessary. As a result, the size of the optical apparatus tends to be enlarged.

BRIEF SUMMARY OF THE INVENTION

The present invention provides a small-sized optical apparatus capable of well reducing an image blur caused by a shake in a high-frequency range.

An optical apparatus as one aspect of the present invention includes an optical system, a shake detector configured to detect a shake, an electro-optic element constituting a part of the optical system and configured to change a refractive-index distribution by an electro-optic effect in accordance with an applied voltage, a drive unit configured to apply a voltage to the electro-optic element so as to reduce an image blur detected by the shake detector, and an anti-shake unit configured separately from the electro-optic element to reduce the image blur detected by the shake detector.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings. First of all, before describing each embodiment, matters common to each embodiment will be described. In each embodiment, an optical apparatus including an image pickup apparatus such as a digital still camera, a video camera, or a film camera, an interchangeable lens configured to be attached to the image pickup apparatus, or an observation apparatus such as a telescope or binoculars will be described. The optical apparatus of each embodiment includes an electro-optic crystal (an electro-optic element), as an element constituting a part of the optical system, which changes its refractive-index distribution in accordance with the electric field generated inside it. Furthermore, the optical apparatus in each embodiment includes a drive circuit (a drive unit) which controls a voltage applied to the electro-optic element.

First, the principle of an optical anti-shake using a change of a refractive-index distribution inside the electro-optic crystal will be described. The refraction of light can be generally explained by using the Snell's law represented by Expression (1). The optical anti-shake which shifts a lens or changes an apex angle of a variable angle prism can also be explained by using the Snell's law.

$$n_1 \times \sin\theta_1 = n_2 \times \sin\theta_2 \qquad (1)$$

In Expression (1), $n_1$ and $n_2$ are refractive indexes of a medium at an incident side and an emission side of light respectively, and $\theta_1$ and $\theta_2$ are an incident angle and an emission angle of the light respectively.

Figure 1:
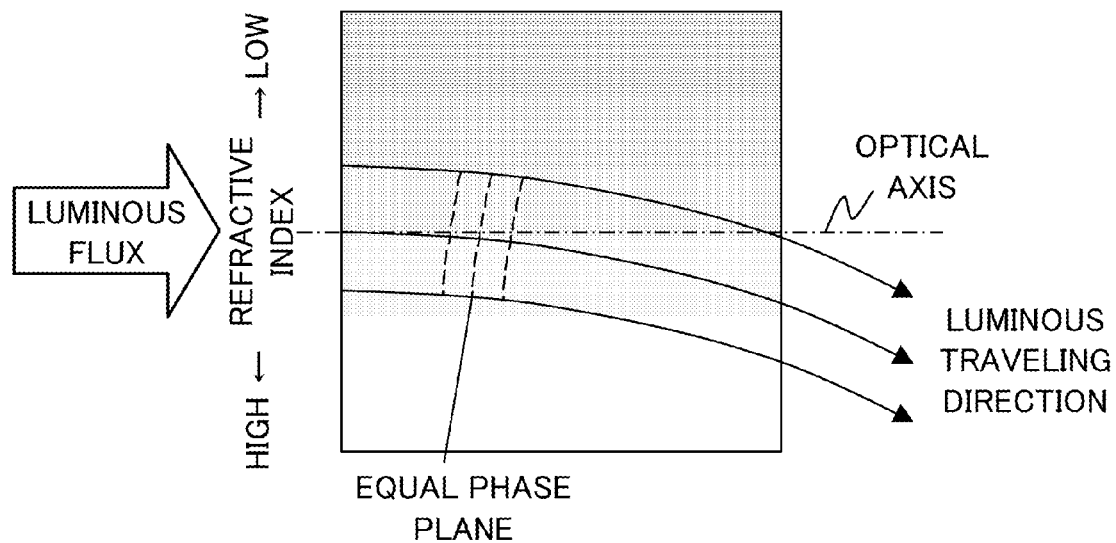
FIG. 1 is a diagram describing a deflection principle of luminous flux in accordance with a refractive-index distribution.

However, if a travel direction of luminous flux changes in accordance with a refractive-index distribution, the Snell's law cannot be used for the explanation. For example, FIG. 1 illustrates a crystal in which the refractive index is uniform in a direction parallel to an optical axis but the refractive-index distribution differs in a direction orthogonal to the optical axis (for example, an electro-optic crystal). When the luminous flux enters the crystal in parallel to the optical axis, the luminous flux should go straight in accordance with the Snell's law. However, in fact, a travel direction of the luminous flux continuously changes in a direction in which the refractive index increases, i.e. a lower side in FIG. 1. The phenomenon can be explained by considering a phase of light.

When the luminous flux enters the crystal which has a refractive-index distribution in an upward and downward direction as illustrated in FIG. 1, values of refractive indexes of areas inside the crystal (media) through which a part at an upper side and a part at an lower side of the luminous flux pass are slightly different from each other. In this case, a phase of a part of the luminous flux which passes through a medium having a higher refractive index is delayed, and a phase of a part of the luminous flux which passes through a medium having a lower refractive index is led. In such a condition, an equal phase plane of the luminous flux (a wave front) faces a downward direction. Since the luminous flux travels in a direction orthogonal to the equal phase plane, as a result, the luminous flux moves inside the crystal while gradually changing its travel direction in the downward direction. Therefore, if the refractive-index distribution can be controlled, the phase difference in the luminous flux, i.e. the equal phase plane, can be controlled and the travel direction of the luminous flux can also be controlled.

When a voltage is applied to the electro-optic crystal, electrons are injected into the crystal and the electric field in the crystal is not uniform in some cases. If the electric field is nonuniform, the electro-optic effect generated in the electro-optic crystal is also biased to generate the refractive-index distribution. The refractive-index distribution can be controlled by the applied voltage. Applying this principle, an optical anti-shake using the electro-optic element can be performed.

Next, a feature of the refractive-index distribution which is generated inside the electro-optic crystal in each embodiment will be described. In order to obtain the optical anti-shake effect, the refractive-index distribution generated inside the electro-optic element is asymmetric with respect to an optical axis of the optical system. In other words, the refractive index changes in a plane orthogonal to the optical axis. If the refractive-index distribution is symmetric with respect to the optical axis, i.e. a so-called radial-type refractive-index distribution in which the refractive index changes in a radial direction with reference to a center of the optical axis, the optical anti-shake effect cannot be obtained. It is because the travel direction of the luminous flux passing through the inside of the element cannot be changed although a focal position of the luminous flux can be changed in the radial-type refractive-index distribution.

Next, a feature of the electro-optic element used in each embodiment will be described. In each embodiment, it is preferable that the electro-optic element containing a solid optical crystal indicating a quadratic electro-optic effect is used. As electro-optic effects, there are a primary electro-optic effect by which the refractive index changes in proportion to the strength of the electric field when applying the electric field to a dielectric crystal (Pockels effect), and a quadratic electro-optic effect by which the refractive index changes in proportion to the square of the strength of the electric field (Kerr effect).

A material indicating the primary electro-optic effect contains $KH_2PO_4$ (KDP), $NH_4H_2PO_4$ (ADP), $LiNbO_3$, $LiTaO_3$, GaAs, CdTe, or the like. A material indicating the quadratic electro-optic effect contains KTN ($KTa_{1-x}Nb_xO_3$), $SrTiO_3$, $Cs_2$, nitrobenzene, or the like.

Using the crystal indicating the quadratic electro-optic effect, a large amount of refractive-index change can be induced even if the voltage applied to the crystal is small. In particular, because the KTN crystal indicates an extremely large electro-optic effect as compared with a different electro-optic crystal, it is preferable for the optical anti-shake. The electro-optic crystal is not limited to the crystal indicating the quadratic electro-optic effect, and a crystal indicating an electro-optic effect having an order more than two, as well as the quadratic electro-optic effect, may also be applied. Furthermore, the response speed of the electro-optic effect of the solid optical crystal is 100 Hz to kHz orders, and therefore an image blur caused by a shake in a high-frequency range as well as a low-frequency range can be sufficiently reduced (corrected).

In each embodiment, an anti-shake device different from the electro-optic element is included. Using the electro-optic element, the response speed of the anti-shake can be extremely faster, but the applied voltage to the electro-optic element needs to be increased in order to significantly change the travel direction of the luminous flux to correct a large image blur. If a deflection angle of the luminous flux is larger, an amount of the aberration generated in the electro-optic element is also larger. Furthermore, generally, a large image blur is generated in a low-frequency range, and an image blur in a high-frequency range is small in many cases.

Accordingly, it is preferable that the electro-optical element is used as an anti-shake device for the high-frequency range and another anti-shake device for the low-frequency range is also provided inside the optical apparatus. When the anti-shake devices used for the high-frequency range and the low-frequency range are switched in the optical apparatus, an anti-shake function acceptable to a wide frequency range from the low-frequency range to the high-frequency range can be obtained.

As another anti-shake device, there is an anti-shake device that uses an optical anti-shake system such as a device that shifts a lens or an image pickup element or a device that uses a variable angle prism. Furthermore, an electronic anti-shake system that shifts a cut range of an image generated using an output of the image pickup element or performs another image processing may also be used.

Figure 2:
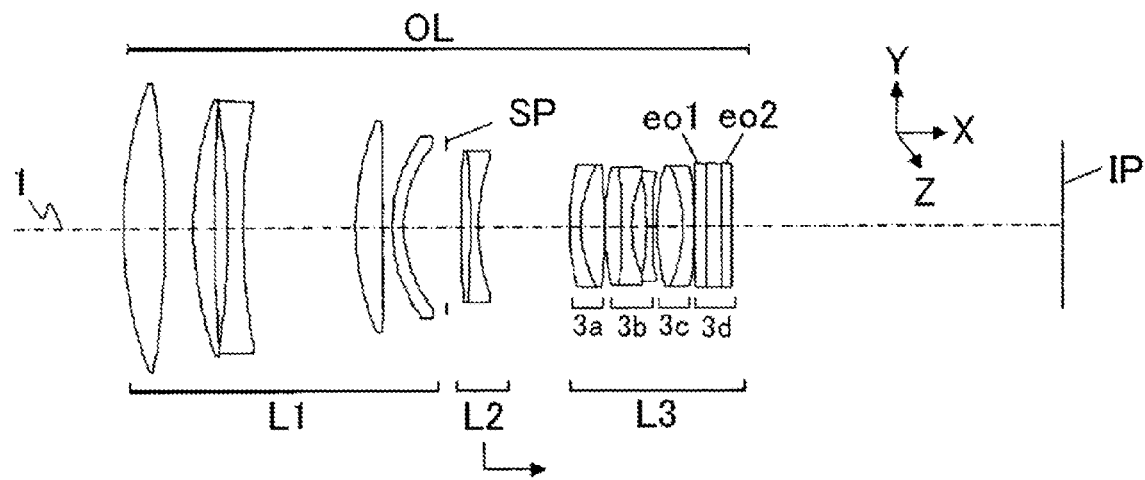
FIG. 2 is an optical cross-sectional diagram of an optical apparatus that is Embodiment 1 of the present invention.
Figure 5:
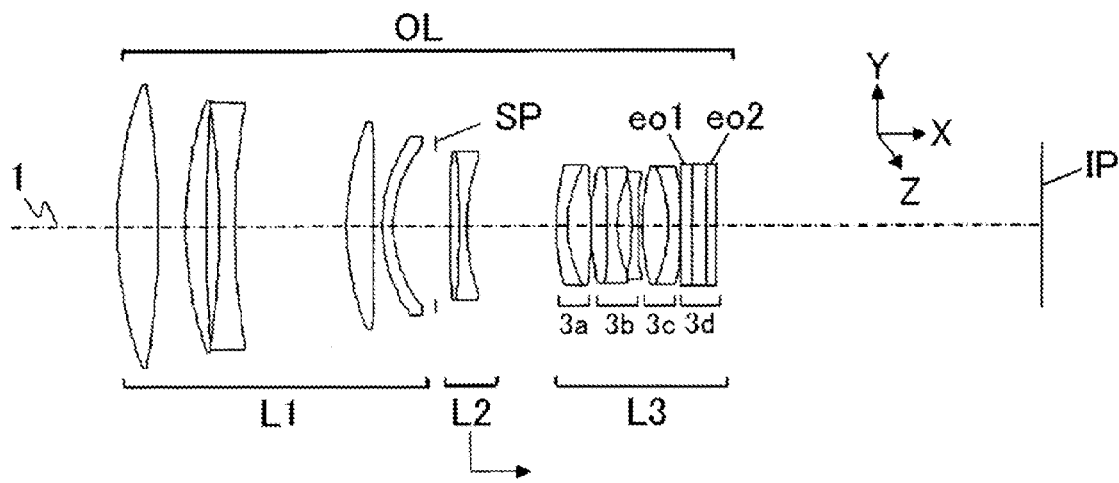
FIG. 5 is an optical cross-sectional diagram of an optical apparatus that is Embodiment 2 of the present invention.
Figure 8:
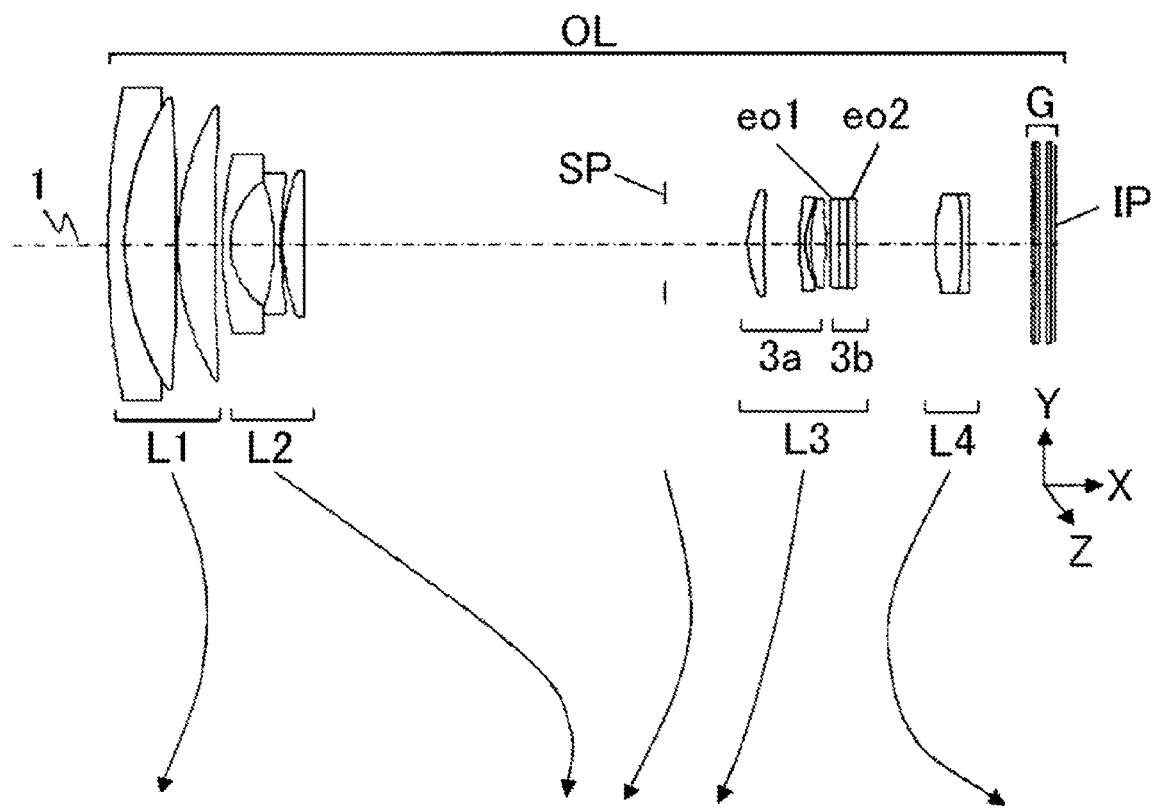
FIG. 8 is an optical cross-sectional diagram of an optical apparatus that is Embodiment 3 of the present invention.

Hereinafter, a specific embodiment of the present invention will be described. FIGS. 2, 5, and 8 illustrate cross sections of optical systems of optical apparatuses that are Embodiments 1, 2, and 3, respectively. In each of these drawings, the left side corresponds to an object side (or a front side or magnification side), and the right side corresponds to an image side (or a rear side or a reduction side). Reference symbol OL denotes a whole of the optical system.

When reference symbol i is defined as an order of a lens unit counted from the object side, reference symbol Li denotes an i-th lens unit. Reference symbol SP denotes an aperture stop. Reference symbol IP denotes an image plane. On the image plane IP, an imaging surface of an image pickup element (a photoelectric conversion element) such as a CCD sensor or a CMOS sensor is arranged in a digital still camera or a video camera, or a film surface is arranged in a film camera. Each of the image pickup element and the film corresponds to a photosensitive member that records an object image formed by the optical system OL. Reference numeral 1 denotes an optical axis of the optical system OL. Reference symbol $eo_i$ (i=1, 2, . . . , m) denotes electro-optic elements. Reference symbols X, Y, and Z denote an optical axis direction, a height direction, a depth direction of the optical system OL, respectively.

In a cross-sectional diagram of FIG. 8, reference symbol G denotes a glass block that corresponds to an insertion filter, an optical low-pass filter, an infrared cut filter, or the like.

Figure 3A:
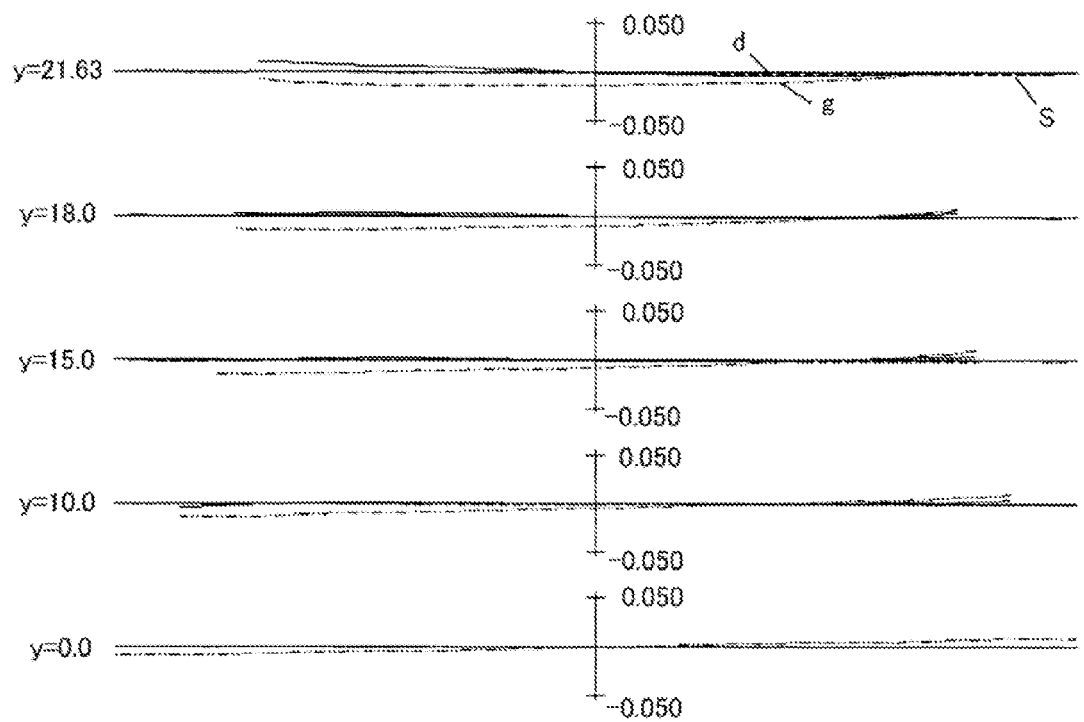
FIGS. 3A to 3C are lateral aberration diagrams of an optical system in Embodiment 1.
Figure 3B:
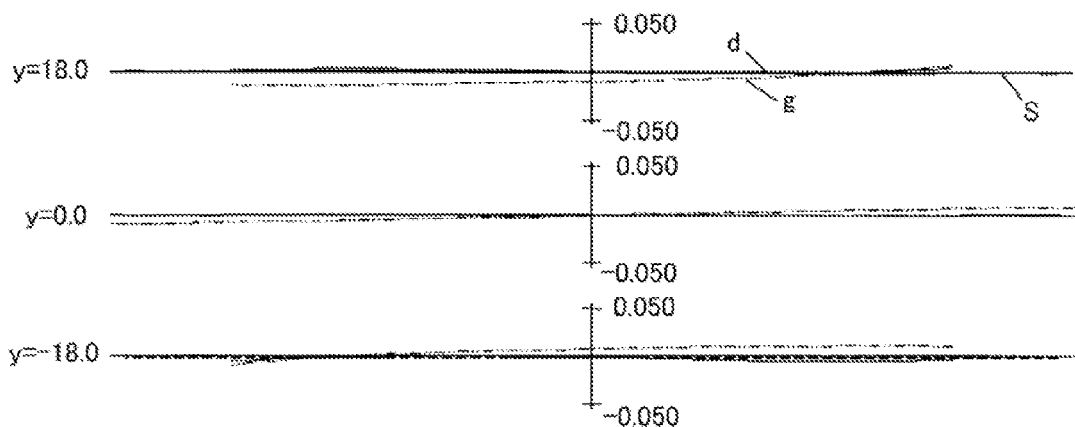
Figure 3C:
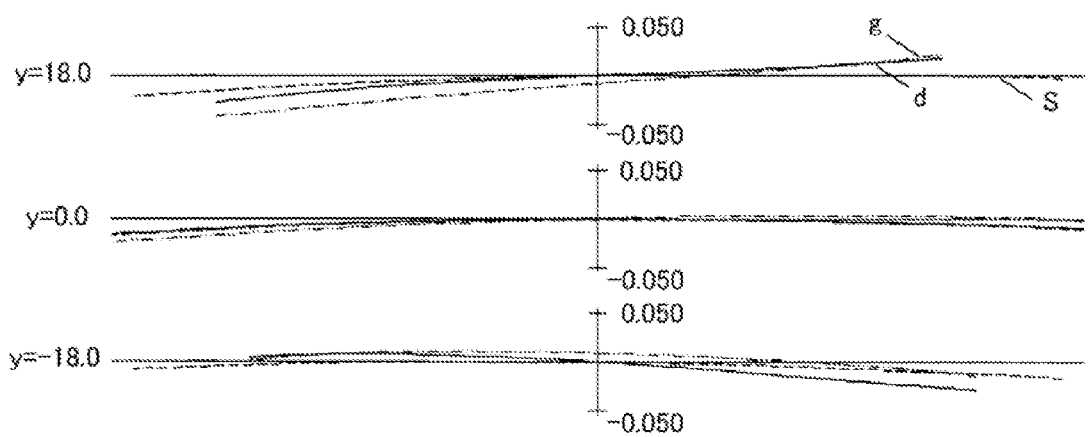
Figure 6A:
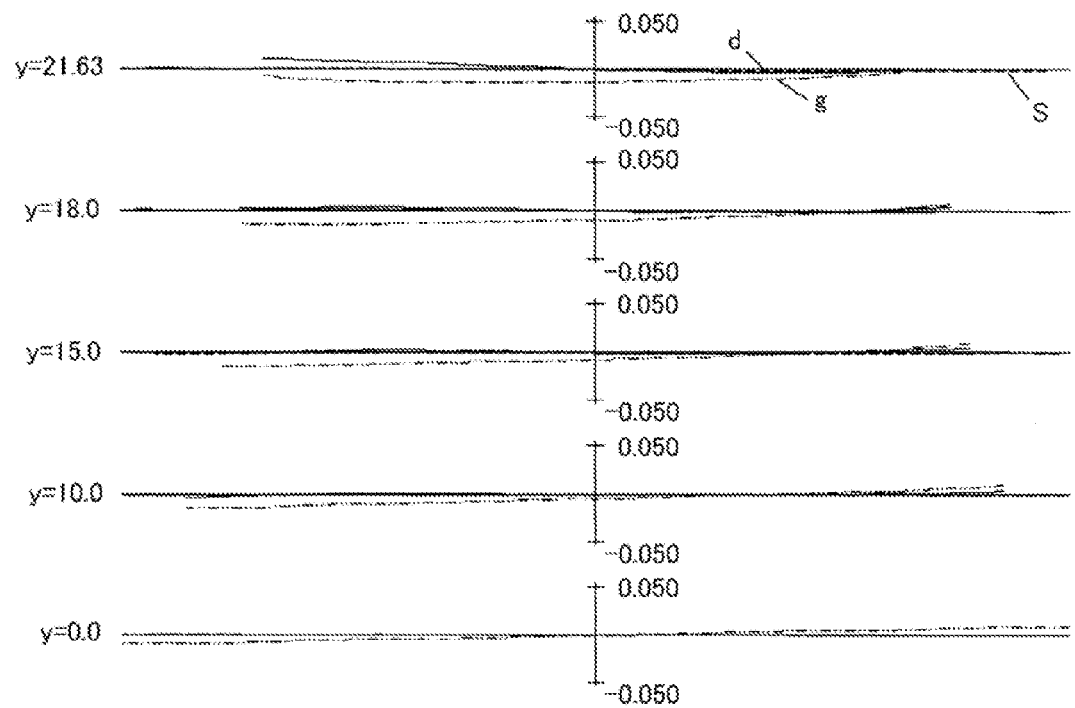
FIGS. 6A to 6C are lateral aberration diagrams of an optical system in Embodiment 2.
Figure 6B:
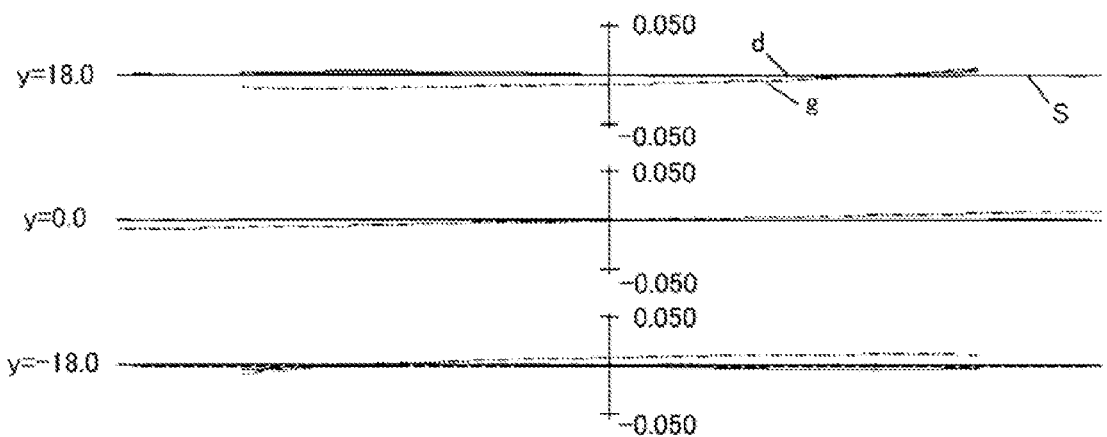
Figure 6C:
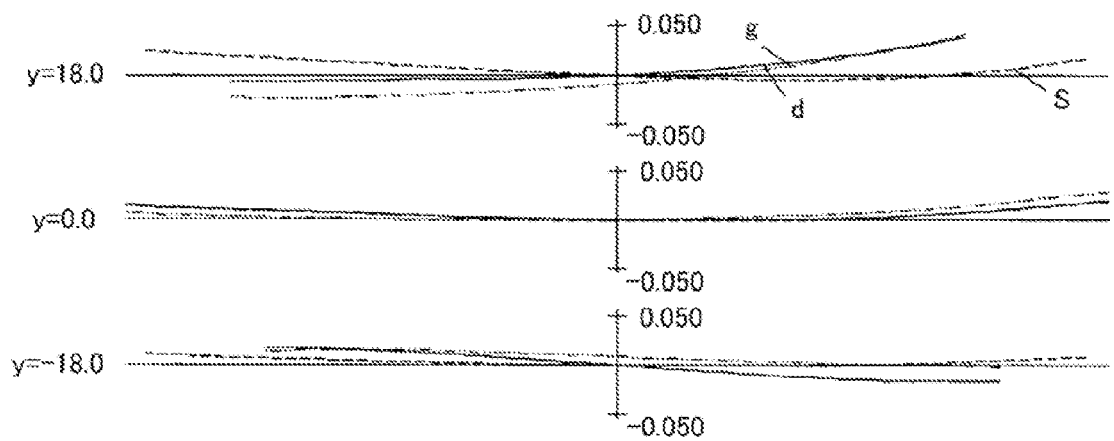
Figure 9A:
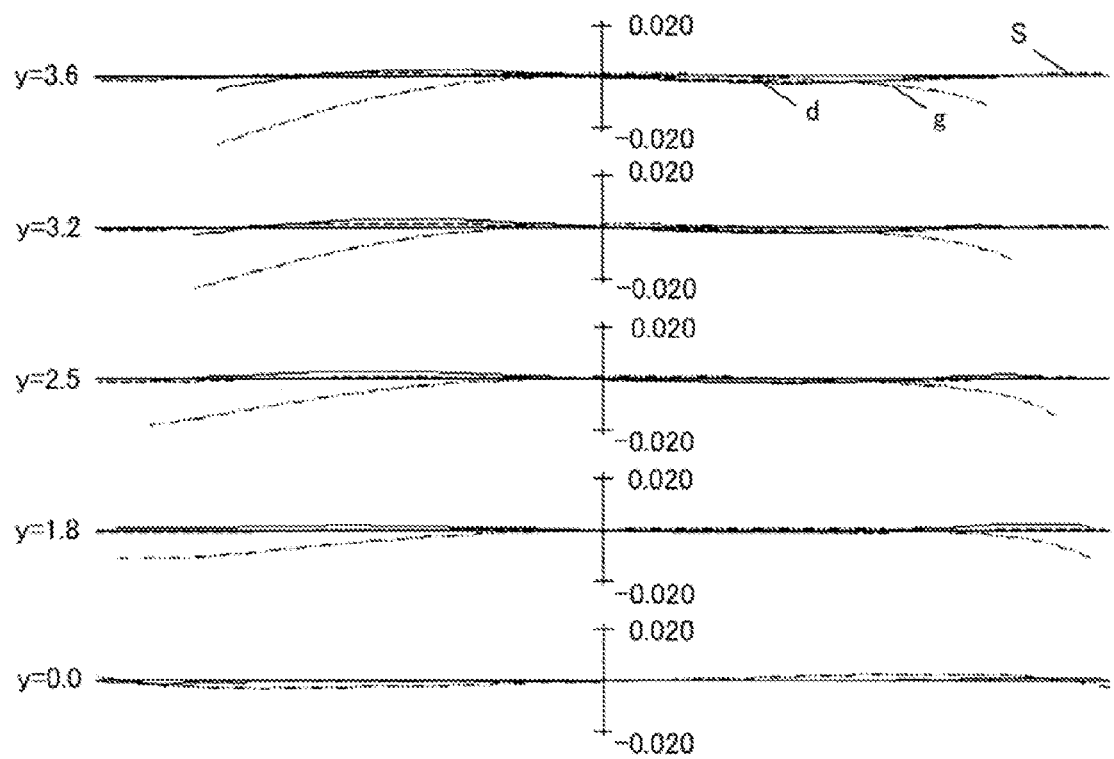
FIGS. 9A to 9C are lateral aberrations of an optical system in Embodiment 3.
Figure 9B:
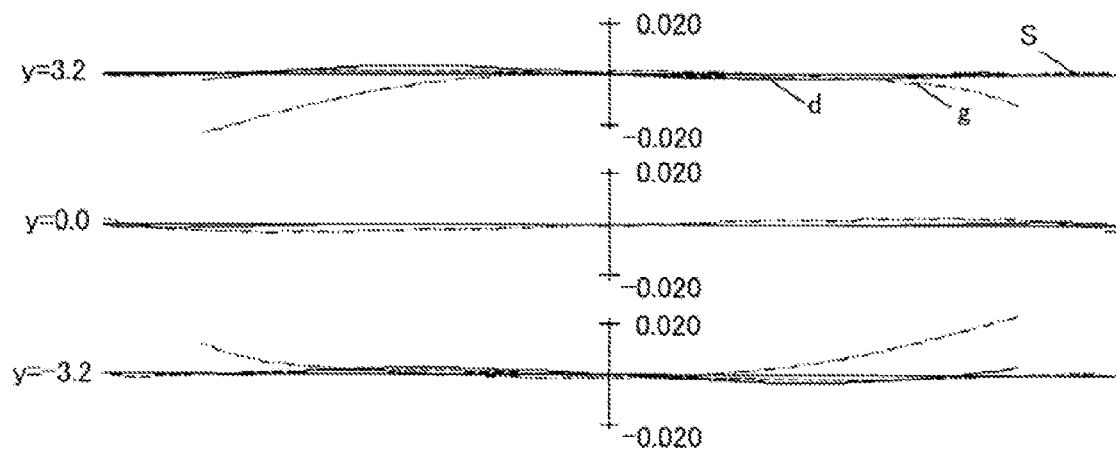
Figure 9C:
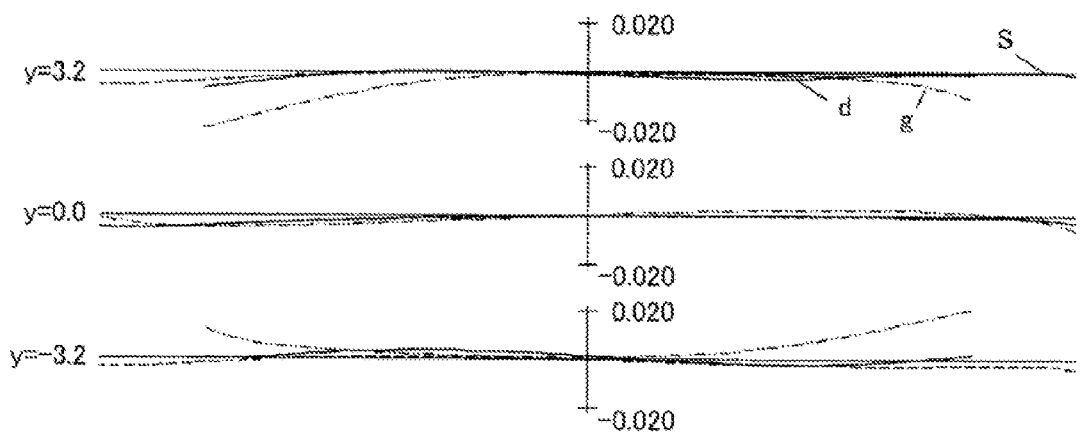

FIGS. 3A to 3C, 6A to 6C, and 9A to 9C illustrate aberration diagrams of optical systems in Embodiments 1, 2, and 3, respectively. In each of these drawings, reference symbols d and g denote a d-line and a g-line respectively, and reference symbol S denotes a sagittal ray. Reference symbol y denotes an image height. Each of FIGS. 3A, 6A, and 9A illustrates lateral aberration diagram in a reference state in which there is no image blur. Each of FIGS. 3B, 6B, and 9B, and each of FIGS. 3C, 6C, and 9C illustrate lateral aberration diagrams in which an anti-shake is performed by an anti-shake electro-optic element unit described below when a shake that causes an image blur in Y and Z directions respectively is generated.

Figure 4:
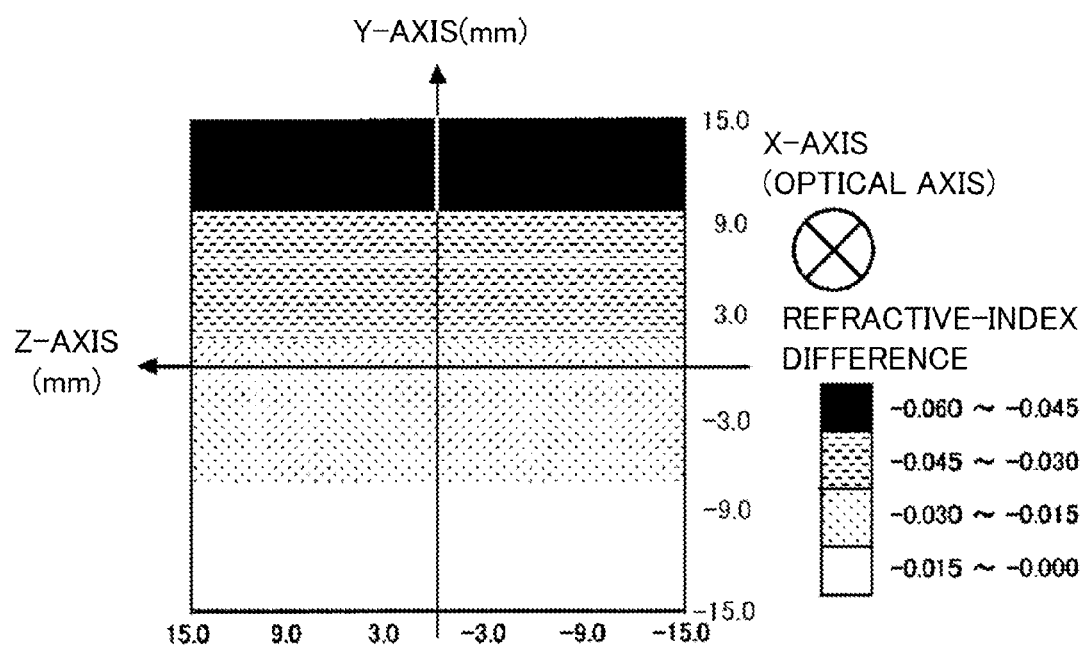
FIG. 4 is a diagram describing a refractive-index distribution in an electro-optic element in Embodiment 1.
Figure 7:
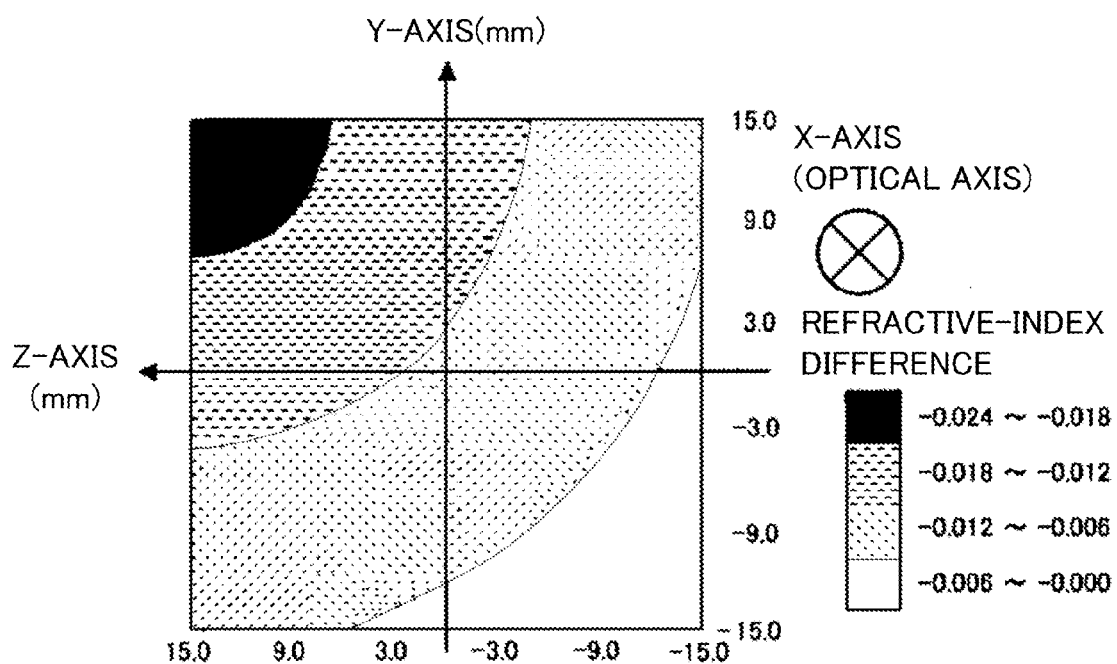
FIG. 7 is a diagram describing a refractive-index distribution in an electro-optic element in Embodiment 2.
Figure 10:
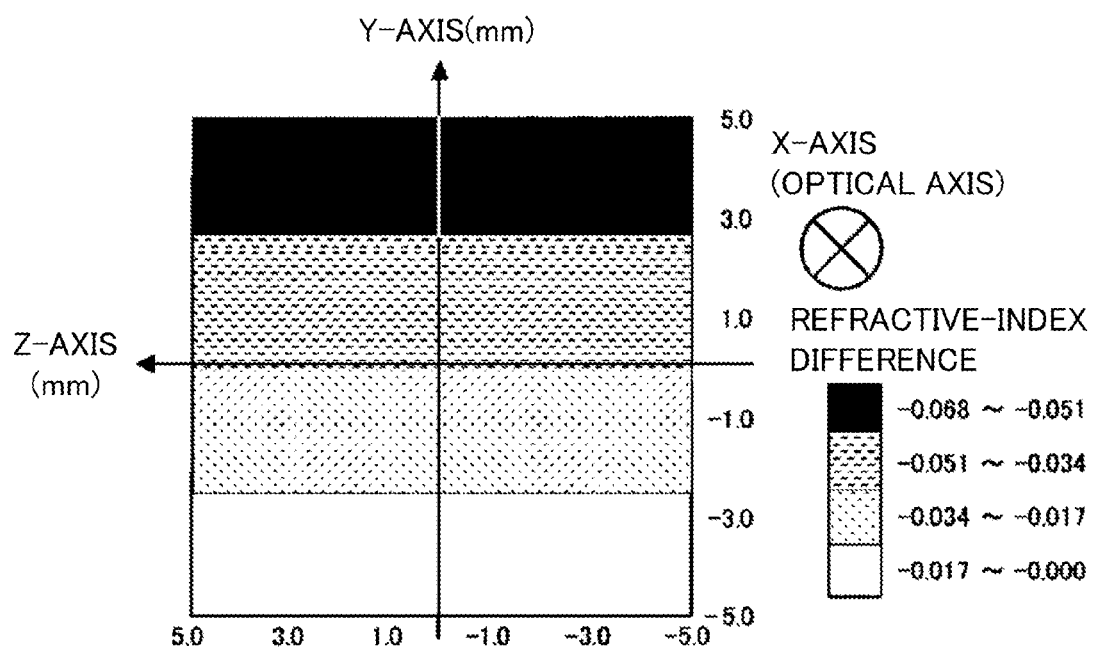
FIG. 10 is a diagram describing a refractive-index distribution in an electro-optic element in Embodiment 3.

FIGS. 4, 7, and 10 illustrate refractive-index distributions in the electro-optic elements in Embodiments 1, 2, and 3, respectively. In these drawings, an X-axis corresponds to the optical axis 1 of the optical system OL, which extends in a direction perpendicular to a paper. A Y-axis and a Z-axis correspond to a height direction and a depth direction, respectively.

Embodiment 1

In Embodiment 1 described with reference to FIG. 2, an optical system OL is a telephoto lens having a focal length of 294 mm. In the optical system OL, a second lens unit L2 is a focus lens unit, which moves to an image side to perform a focus operation when an object distance decreases. A third lens unit L3 includes a first lens component 3a and a third lens component 3c which are fixed (do not move) in performing a focus operation and an anti-shake operation, and an anti-shake lens unit 3b which shifts in a direction orthogonal to an optical axis 1 in performing the anti-shake operation. The third lens unit L3 includes an anti-shake electro-optic element unit 3d which is constituted by electro-optic elements eo1 and eo2.

The anti-shake lens unit 3b is mainly used for reducing or correcting an image blur caused by a shake in a low-frequency range. The anti-shake electro-optic element unit 3d is mainly used for reducing an image blur caused by a shake in a high-frequency range. Thus, the anti-shake unit to be used is switched in accordance with the frequency range of the shake to be able to obtain a good anti-shake performance with respect to a shake over a wide frequency range.

Instead of the anti-shake lens unit 3b, the image pickup element arranged on an image plane IP may also be shifted in a direction orthogonal to the optical axis 1 to correct the image blur in the low-frequency range. Furthermore, the image blur in the low-frequency range may also be corrected using the electronic anti-shake system described above.

In the anti-shake electro-optic element unit 3d, the electro-optic element eo1 corrects an image blur caused by a rotational shake in a pitch (vertical) direction, and the electro-optic element eo2 corrects an image blur caused by a rotational shake in a yaw (horizontal) direction. Thus, since the anti-shake electro-optic element unit 3d has a configuration in which one electro-optic element is used for one optical cross section, the size of an optical apparatus having the anti-shake electro-optic element unit can be reduced.

FIG. 3A, as described above, illustrates a lateral aberration diagram of the optical system OL of the present embodiment in a reference state where there is no image blur. FIGS. 3B and 3C illustrate lateral aberration diagrams when the anti-shake operation is performed by the anti-shake electro-optic element unit 3d while a shake (a rotational shake of 0.14 degree) causing image blurs of y=−0.5 mm in a Y direction and z=−0.5 mm in a Z direction respectively is generated in the optical apparatus.

The anti-shake electro-optic element unit 3d uses the KTN crystal as electro-optic elements eo1 and eo2. FIG. 4 illustrates a refractive-index distribution generated in the electro-optic element eo1, which has a maximum refractive-index difference of 0.056. A refractive-index distribution which corresponds to one obtained by rotating the refractive-index distribution of the electro-optic element eo1 by 90 degrees is given to the electro-optic element eo2.

Figure 13:
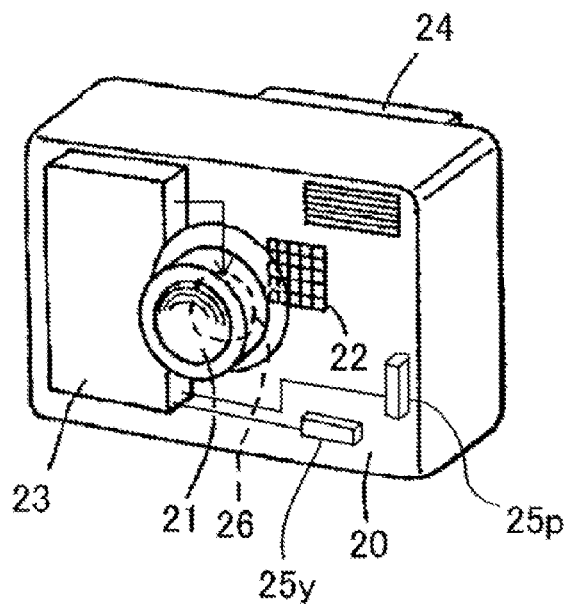
FIG. 13 is a schematic diagram of an optical apparatus in Embodiments 1 to 3.

Voltages are applied to the electro-optic elements eo1 and eo2 in direction orthogonal to the optical axis 1 (a Y-axis direction that is a pitch direction, and a Z-axis direction that is a yaw direction) by the drive circuit (see FIG. 13). Thus, inside the electro-optic elements eo1 and eo2, refractive-index distributions continuously changing in each direction of the applied voltage are generated to well correct the image blurs in the pitch direction and the yaw direction.

Embodiment 2

In Embodiment 2 described with reference to FIG. 5, an optical system OL is a telephoto lens having a focal length of 294 mm. The optical system OL, basically, has the same configuration as that of the optical system of Embodiment 1. A third lens unit L3 includes an anti-shake electro-optic element unit 3d containing electro-optic elements eo1 and eo2.

FIG. 6A, as described above, illustrates a lateral aberration diagram of the optical system OL of the present embodiment in a reference state where there is no image blur. FIGS. 6B and 6C illustrate lateral aberration diagrams when the anti-shake operation is performed by the anti-shake electro-optic element unit 3d while a shake (a rotational shake of 0.03 degree) causing image blurs of y=−0.1 mm in a Y direction and z=−0.1 mm in a Z direction respectively is generated in the optical apparatus.

Also in the present embodiment, the KTN crystal is used as electro-optic elements eo1 and eo2 of the anti-shake electro-optic element unit 3d. FIG. 7 illustrates a refractive-index distribution generated in the electro-optic element eo1, which has a maximum refractive-index difference of 0.022.

A voltage is applied to the electro-optic element eo1 treating a position which is placed at 15.0 mm in the Y-axis direction and 15.0 mm in the Z-axis direction with reference to the optical axis 1 as a center by using the drive circuit (see FIG. 13). Thus, the refractive-index distribution which concentrically and continuously changes in the electro-optic element eo1 is generated. Such concentric refractive-index distribution is generated to be able to well correct the image blur in the Y-axis direction that is a pitch direction and in the Z-axis direction that is a yaw direction only by using one electro-optic element eo1.

No refractive-index distribution needs to be given to the electro-optic element eo2, but a voltage may also be applied to the electro-optic element eo2 to give a refractive-index distribution to obtain a good anti-shake performance.

Embodiment 3

In Embodiment 3 described with reference to FIG. 8, an optical system OL is a zoom lens having a focal length which changes between 6 mm and 96.5 mm. The optical system OL, in order from an object side, includes a first lens unit L1 having a positive refractive power, a second lens unit L2 having a negative refractive power, a third lens unit L3 having a positive refractive power, and a fourth lens unit L4 having a positive refractive power.

As indicated by arrows in FIG. 8, in a zoom operation from a wide-angle end to a telephoto end, the first lens unit L1 moves with a convex trajectory to an image side, and the second lens unit L2 moves to the image side. The third lens unit L3 moves to an object side, and the fourth lens unit L4 moves with a convex trajectory to the object side.

The fourth lens unit L4 is a focus lens unit, which moves to the object side for performing a focus operation when an object distance becomes short.

The third lens unit L3 includes an anti-shake lens unit 3*a* which shifts in a direction orthogonal to the optical axis 1 in performing the anti-shake operation, and an ant-shake electro-optic element unit 3*b* containing electro-optic elements eo1 and eo2.

The anti-shake lens unit 3*a* is mainly used for correcting an image blur caused by a shake in a low-frequency range. The anti-shake electro-optic element unit 3*b* is mainly used for reducing an image blur caused by a shake in a high-frequency range. Thus, the used anti-shake unit is switched in accordance with the frequency range of the shake to be able to obtain a good anti-shake performance with respect to a wide frequency range.

The image blur in the low-frequency range may also be corrected by shifting an image pickup element arranged in an image plane IP in a direction orthogonal to the optical axis 1, instead of using the anti-shake lens unit 3*a*. The image blur in the low-frequency range may also be corrected by using the electronic anti-shake system described above.

FIG. 9A, as described above, illustrates a lateral aberration diagram of the optical system OL of the present embodiment in a reference state where there is no image blur. FIGS. 9B and 9C illustrate lateral aberration diagrams when the anti-shake operation is performed by the anti-shake electro-optic element unit 3*b* while a shake (a rotational shake of 0.17 degree) causing image blurs of y=−0.2 mm in a Y direction and z=−0.2 mm in a Z direction respectively is generated in the optical apparatus.

Also in the present embodiment, the KTN crystal is used as electro-optic elements eo1 and eo2 of the anti-shake electro-optic element unit 3*b*. FIG. 10 illustrates a refractive-index distribution generated in the electro-optic element eo1, which has a maximum refractive-index difference of 0.068. A refractive-index distribution which corresponds to one obtained by rotating the refractive-index distribution of the electro-optic element eo1 by 90 degrees is given to the electro-optic element eo2.

Voltages are applied to the electro-optic elements eo1 and eo2 in direction orthogonal to the optical axis (a Y-axis direction that is a pitch direction, and a Z-axis direction that is a yaw direction) by the drive circuit (see FIG. 13). Thus, refractive-index distributions continuously changing in each direction of the applied voltage are generated inside the electro-optic elements eo1 and eo2 to well correct the image blurs in the pitch direction and the yaw direction.

As described above, according to the above Embodiments 1 to 3, a small-sized optical apparatus capable of well reducing an image blur caused by a shake in a high-frequency can be realized.

Figure 11:
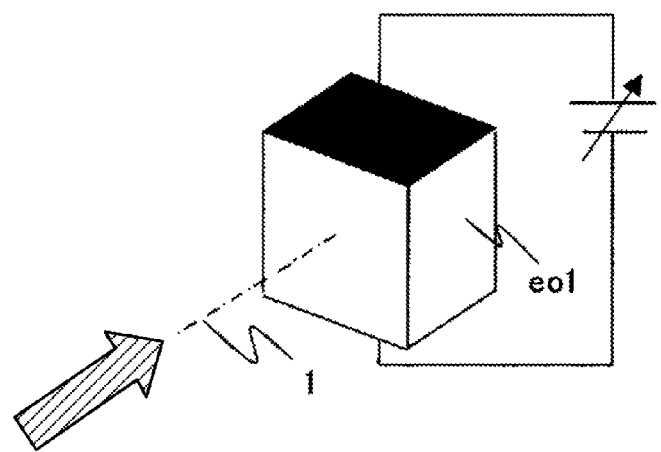
FIG. 11 is a diagram illustrating an electrode structure of an electro-optic element in Embodiments 1 and 3.

FIG. 11 illustrates an arrangement of electrodes of the electro-optic element used in Embodiments 1 and 3. The electrodes are arranged on two surfaces opposite to each other, each of which is a surface of an electro-optic crystal having a rectangular shape and does not intersect with the optical axis 1. A voltage is applied between the two electrodes to be able to generate a refractive-index distribution in a direction orthogonal to the optical axis 1 in the electro-optic crystal. Furthermore, the applied voltage is changed (controlled) to be able to change the refractive-index distribution, and thus a deflection angle of luminous flux can be controlled.

Figure 12:
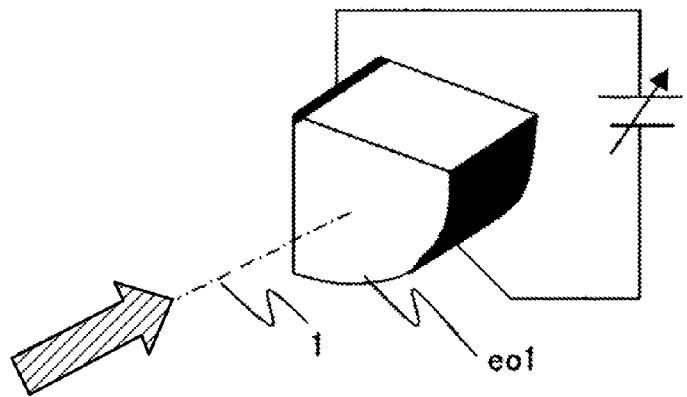
FIG. 12 is a diagram illustrating an electrode structure of an electro-optic element in Embodiment 2.

FIG. 12 illustrates an arrangement of electrodes of the electro-optic element used in Embodiment 2. The electrodes are provided at a top of the fan-like electro-optic crystal and its peripheral portion. A voltage is applied between these two electrodes to be able to generate a concentric refractive-index distribution in the electro-optic crystal. Furthermore, the applied voltage is changed (controlled) to be able to change the refractive-index distribution, and thus the deflection angle of the luminous flux can be controlled.

Hereinafter, Numerical examples 1 to 3 which correspond to Embodiments 1 to 3 respectively will be described. A surface number is counted from the object side in order. Reference symbol R denotes a radius of curvature (mm), reference symbol D denotes a surface interval (mm), reference symbols Nd and ν are a refractive index and Abbe number with respect to a d-line, respectively. The electro-optic elements used in the optical system are denoted by eo1 and eo2. Reference symbol BF denotes a back focus, and a total lens length represents a distance from a first surface to an image plane.

An aspherical surface is indicated by adding reference symbol * after a surface number. The aspherical surface shape is represented by the following expression (2), where x is a displacement from a top of a surface in an optical axis direction, h is a height from the optical axis, r is a paraxial radius of curvature, k is a conic constant, B, C, D, and E are aspherical surface coefficients of respective orders.

$$x(h) = \frac{(1/r)h^2}{1+\sqrt{\{1-(1+k)(h/r)^2\}}} + Bh^4 + Ch^6 + Dh^8 + Eh^{10} \quad (2)$$

Furthermore, "E±XX" described in each aspherical surface coefficient means "$\times 10^{\pm XX}$".

Numerical Example 1

Unit mm
Surface data

| Surface number | R | D | Nd | νd | Effective diameter |
|---|---|---|---|---|---|
| 1 | 107.543 | 10.89 | 1.49700 | 81.5 | 70.95 |
| 2 | −217.961 | 7.35 | | | 70.49 |
| 3 | 102.079 | 5.42 | 1.48749 | 70.2 | 62.50 |
| 4 | 485.303 | 3.47 | | | 61.65 |
| 5 | −207.073 | 4.00 | 1.80610 | 40.9 | 61.49 |
| 6 | 193.377 | 29.52 | | | 59.15 |
| 7 | 71.436 | 7.24 | 1.49700 | 81.5 | 51.40 |
| 8 | −700.553 | 2.31 | | | 50.58 |
| 9 | 40.218 | 3.00 | 1.63980 | 34.5 | 44.20 |
| 10 | 33.251 | 11.09 | | | 41.04 |
| 11(Stop) | ∞ | 0.00 | | | 38.83 |
| 12 | ∞ | 4.00 | | | 38.83 |
| 13 | 400.748 | 2.46 | 1.80518 | 25.4 | 36.40 |
| 14 | −217.229 | 2.00 | 1.69680 | 55.5 | 35.96 |
| 15 | 57.418 | 23.56 | | | 33.97 |
| 16 | 63.787 | 3.00 | 1.84666 | 23.9 | 29.23 |
| 17 | 32.433 | 5.91 | 1.63930 | 44.9 | 27.78 |
| 18 | −327.648 | 0.30 | | | 27.15 |

-continued

| | | | | | |
|---|---|---|---|---|---|
| 19 | 71.436 | 4.38 | 1.80518 | 25.4 | 27.00 |
| 20 | −147.120 | 2.50 | 1.69680 | 55.5 | 26.47 |
| 21 | 32.372 | 3.85 | | | 25.11 |
| 22 | −71.220 | 1.50 | 1.77250 | 49.6 | 25.15 |
| 23 | 100.738 | 1.20 | | | 26.03 |
| 24 | 57.788 | 6.80 | 1.69680 | 55.5 | 27.93 |
| 25 | −37.880 | 3.00 | 1.83400 | 37.2 | 28.34 |
| 26 | −100.960 | 0.15 | | | 29.37 |
| 27 | ∞ | 3.00 | 2.24163 | 16.9 | 29.57 eo1 |
| 28 | ∞ | 4.00 | 2.24163 | 16.9 | 29.79 |
| 29 | ∞ | 3.00 | 2.24163 | 16.9 | 30.07 eo2 |
| 30 | ∞ | 86.14 | | | 30.29 |

Various kinds of data

| | |
|---|---|
| Focal length | 294.00 |
| F-number | 4.14 |
| Angle of field | 4.21 |
| Image height | 21.64 |
| Total lens length | 245.03 |
| BF | 86.14 |
| Entrance pupil position | 131.49 |
| Exit pupil position | −51.93 |
| Front side principal point position | −200.57 |
| Rear side principal point position | −207.86 |

Lens unit data

| Lens unit | Start surface | Focal position | Lens constitutional length | Front side principal point position | Rear side principal point position |
|---|---|---|---|---|---|
| 1 | 1 | 131.72 | 84.29 | 16.84 | −61.30 |
| 2 | 13 | −104.61 | 4.46 | 3.15 | 0.60 |
| 3 | 16 | 2447.60 | 42.58 | −190.30 | −202.68 |

Lens element data

| Lens element | Start surface | Focal length |
|---|---|---|
| 1 | 1 | 146.52 |
| 2 | 3 | 263.95 |
| 3 | 5 | −123.50 |
| 4 | 7 | 130.84 |
| 5 | 9 | −360.62 |
| 6 | 13 | 175.26 |
| 7 | 14 | −64.98 |
| 8 | 16 | −81.51 |
| 9 | 17 | 46.46 |
| 10 | 19 | 60.26 |
| 11 | 20 | −37.86 |
| 12 | 22 | −53.81 |
| 13 | 24 | 33.82 |
| 14 | 25 | −74.30 |
| 15 | 27 | ∞ |
| 16 | 28 | ∞ |
| 17 | 29 | ∞ |

Numerical Example 2

Unit mm
Surface data

| Surface number | R | D | Nd | νd | Effective diameter |
|---|---|---|---|---|---|
| 1 | 107.543 | 10.89 | 1.49700 | 81.5 | 70.95 |
| 2 | −217.961 | 7.35 | | | 70.49 |
| 3 | 102.079 | 5.42 | 1.48749 | 70.2 | 62.50 |
| 4 | 485.303 | 3.47 | | | 61.65 |
| 5 | −207.073 | 4.00 | 1.80610 | 40.9 | 61.49 |
| 6 | 193.377 | 29.52 | | | 59.15 |
| 7 | 71.436 | 7.24 | 1.49700 | 81.5 | 51.40 |
| 8 | −700.553 | 2.31 | | | 50.58 |
| 9 | 40.218 | 3.00 | 1.63980 | 34.5 | 44.20 |
| 10 | 33.251 | 11.09 | | | 41.04 |
| 11(Stop) | ∞ | 0.00 | | | 38.83 |
| 12 | ∞ | 4.00 | | | 38.83 |
| 13 | 400.748 | 2.46 | 1.80518 | 25.4 | 36.40 |
| 14 | −217.229 | 2.00 | 1.69680 | 55.5 | 35.96 |
| 15 | 57.418 | 23.56 | | | 33.97 |
| 16 | 63.787 | 3.00 | 1.84666 | 23.9 | 29.23 |
| 17 | 32.433 | 5.91 | 1.63930 | 44.9 | 27.78 |
| 18 | −327.648 | 0.30 | | | 27.15 |
| 19 | 71.436 | 4.38 | 1.80518 | 25.4 | 27.00 |
| 20 | −147.120 | 2.50 | 1.69680 | 55.5 | 26.47 |
| 21 | 32.372 | 3.85 | | | 25.11 |
| 22 | −71.220 | 1.50 | 1.77250 | 49.6 | 25.15 |
| 23 | 100.738 | 1.20 | | | 26.03 |
| 24 | 57.788 | 6.80 | 1.69680 | 55.5 | 27.93 |
| 25 | −37.880 | 3.00 | 1.83400 | 37.2 | 28.34 |
| 26 | −100.960 | 0.15 | | | 29.37 |
| 27 | ∞ | 3.00 | 2.24163 | 16.9 | 29.57 eo1 |
| 28 | ∞ | 4.00 | 2.24163 | 16.9 | 29.79 |
| 29 | ∞ | 3.00 | 2.24163 | 16.9 | 30.07 eo2 |
| 30 | ∞ | 86.14 | | | 30.29 |

Various kinds of data

| | |
|---|---|
| Focal length | 294.00 |
| F-number | 4.14 |
| Angle of field | 4.21 |
| Image height | 21.64 |
| Total lens length | 245.03 |
| BF | 86.14 |
| Entrance pupil position | 131.49 |
| Exit pupil position | −51.93 |
| Front side principal point position | −200.57 |
| Rear side principal point position | −207.86 |

Lens unit data

| Lens unit | Start surface | Focal position | Lens constitutional length | Front side principal point position | Rear side principal point position |
|---|---|---|---|---|---|
| 1 | 1 | 131.72 | 84.29 | 16.84 | −61.30 |
| 2 | 13 | −104.61 | 4.46 | 3.15 | 0.60 |
| 3 | 16 | 2447.60 | 42.58 | −190.30 | −202.68 |

Lens element data

| Lens element | Start surface | Focal length |
|---|---|---|
| 1 | 1 | 146.52 |
| 2 | 3 | 263.95 |
| 3 | 5 | −123.50 |
| 4 | 7 | 130.84 |
| 5 | 9 | −360.62 |
| 6 | 13 | 175.26 |
| 7 | 14 | −64.98 |
| 8 | 16 | −81.51 |
| 9 | 17 | 46.46 |
| 10 | 19 | 60.26 |
| 11 | 20 | −37.86 |
| 12 | 22 | −53.81 |
| 13 | 24 | 33.82 |
| 14 | 25 | −74.30 |
| 15 | 27 | ∞ |
| 16 | 28 | ∞ |
| 17 | 29 | ∞ |

Numerical Example 3

| Unit mm Surface data | | | | | |
|---|---|---|---|---|---|
| Surface number | R | D | Nd | νd | Effective diameter |
| 1 | 88.322 | 2.00 | 1.83400 | 37.2 | 33.01 |
| 2 | 30.382 | 5.92 | 1.49700 | 81.5 | 30.79 |
| 3 | −274.859 | 0.16 | | | 30.35 |
| 4 | 30.935 | 4.27 | 1.62299 | 58.2 | 28.99 |
| 5 | 272.660 | (Variable) | | | 28.54 |
| 6 | 40.368 | 1.00 | 1.88300 | 40.8 | 18.48 |
| 7 | 8.690 | 4.93 | | | 14.13 |
| 8 | −22.248 | 0.80 | 1.77250 | 49.6 | 14.10 |
| 9 | 54.595 | 0.22 | | | 14.48 |
| 10 | 21.649 | 2.40 | 1.92286 | 18.9 | 15.02 |
| 11 | 360.470 | (Variable) | | | 14.89 |
| 12(Stop) | ∞ | (Variable) | | | 8.15 |
| 13* | 13.368 | 1.96 | 1.77250 | 49.6 | 10.66 |
| 14 | 98.523 | 4.13 | | | 10.45 |
| 15 | 43.375 | 0.70 | 1.84666 | 23.9 | 9.23 |
| 16 | 11.359 | 0.58 | | | 8.88 |
| 17 | 20.912 | 1.63 | 1.69680 | 55.5 | 8.92 |
| 18 | −71.576 | 0.50 | | | 8.88 |
| 19 | ∞ | 1.00 | 2.24163 | 16.9 | 8.88 eo1 |
| 20 | ∞ | 1.00 | 2.24163 | 16.9 | 8.88 |
| 21 | ∞ | 1.00 | 2.24163 | 16.9 | 8.88 eo2 |
| 22 | ∞ | (Variable) | | | 8.88 |
| 23* | 20.883 | 3.00 | 1.48749 | 70.2 | 9.57 |
| 24 | −53.497 | 0.80 | 1.64769 | 33.8 | 9.31 |
| 25 | 4000.830 | (Variable) | | | 9.22 |
| 26 | ∞ | 0.31 | 1.54427 | 70.6 | 20.94 |
| 27 | ∞ | 0.50 | 1.49400 | 75.0 | 20.94 |
| 28 | ∞ | 0.80 | | | 20.94 |
| 29 | ∞ | 0.50 | 1.49831 | 65.1 | 20.94 |
| 30 | ∞ | 0.83 | | | 20.94 |

| Aspherical surface data | | | | | |
|---|---|---|---|---|---|
| | Conic constant (K) k | Fourth-order coefficient (B) B | Sixth-order coefficient (C) C | Eighth-order coefficient (D) D | Tenth-order coefficient (E) E |
| Thirteenth surface | −1.657140E+00 | 5.695690E−05 | 4.235060E−08 | −2.306770E−09 | 5.353810E−11 |
| Twenty-third surface | 4.869640E−02 | −1.476950E−05 | 1.639150E−06 | −7.424260E−08 | 1.336770E−09 |

| Various kinds of data Zoom ratio 16.1 | | | |
|---|---|---|---|
| | Wide angle | Intermediate | Telephoto |
| Focal length | 6.00 | 26.77 | 96.50 |
| F-number | 2.88 | 3.78 | 4.10 |
| Half angle of field | 30.75 | 7.60 | 2.12 |
| Image height | 3.57 | 3.57 | 3.57 |
| Total lens length | 109.55 | 101.62 | 110.00 |
| BF | 0.83 | 0.83 | 0.83 |
| d 5 | 0.80 | 21.81 | 35.02 |
| d11 | 41.68 | 15.05 | 1.22 |
| d12 | 9.55 | 1.20 | 5.13 |
| d22 | 9.22 | 4.64 | 23.80 |
| d25 | 7.37 | 18.00 | 3.94 |
| Entrance pupil position | 23.62 | 89.21 | 216.64 |
| Exit pupil position | −105.81 | −43.02 | −185.10 |
| Front side principal point position | 29.28 | 99.64 | 263.05 |
| Rear side principal point position | −5.17 | −25.94 | −95.70 |

-continued

Lens element data

| Lens unit | Start surface | Focal position | Lens constitutional length | Front side principal point position | Rear side principal point position |
|---|---|---|---|---|---|
| 1 | 1 | 55.05 | 12.34 | 4.70 | −3.18 |
| 2 | 6 | −11.34 | 9.34 | 0.92 | −6.46 |
| 3 | 13 | 23.88 | 12.50 | −0.94 | −9.91 |
| 4 | 23 | 49.17 | 3.80 | −0.32 | −2.80 |

Lens element data

| Lens element | Start surface | Focal length |
|---|---|---|
| 1 | 1 | −56.42 |
| 2 | 2 | 55.40 |
| 3 | 4 | 55.63 |
| 4 | 6 | −12.73 |
| 5 | 8 | −20.37 |
| 6 | 10 | 24.87 |
| 7 | 13 | 19.82 |
| 8 | 15 | −18.36 |
| 9 | 17 | 23.40 |
| 10 | 19 | ∞ |
| 11 | 20 | ∞ |
| 12 | 21 | ∞ |
| 13 | 23 | 31.22 |
| 14 | 24 | −81.50 |

Embodiment 4

FIG. 13 illustrates a digital still camera (an image pickup apparatus) as an optical apparatus that is Embodiment 4 of the present invention. The camera uses the optical system described in Embodiments 1 to 3 as an image pickup optical system. In FIG. 13, reference numeral 20 denotes a camera body, and reference numeral 21 denotes the optical system described in Embodiments 1 to 3. The optical system 21 includes an anti-shake electro-optic element unit 26 using electro-optic elements eo1 and eo2 described in Embodiments 1 to 3.

Reference numeral 22 denotes an image pickup element (a photoelectric conversion element) which is embedded in the camera body 20 and performs a photoelectric conversion of an object image formed by the optical system 21. An image generated using an output from the image pickup element 22 is, for example, displayed on a back display 24 which is constituted by a display element such as a liquid crystal panel.

Reference numerals 25p and 25y are shake sensors (shake detectors) which detect a pitch direction and a yaw direction of the camera body 20 respectively, each of which is constituted by an angular velocity sensor or the like. Reference numeral 23 denotes a drive circuit which applies a voltage to the anti-shake electro-optic element unit 26 (the electro-optic elements eo1 and eo2) so as to reduce the image blur caused by a shake detected by the shake sensors 25p and 25y.

Thus, the optical system of each of Embodiments 1 to 3 is applied to the image pickup apparatus such as a digital still camera to be able to realize a small-sized image pickup apparatus having a high optical performance. In each of the above embodiments, the case where the shake of the camera is detected by using the shake sensor, but a motion component (a motion vector) may also be calculated based on an image generated using an output from the image pickup element to detect the shake of the camera based on the motion component. In each of the above embodiments, the electro-optic element is used to be able to realize a small-sized optical apparatus capable of well reducing an image blur caused by a shake in a high-frequency range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-171735, filed on Jul. 23, 2009, which is hereby incorporated by reference herein in its entirety.

What is claimed is:

1. An optical apparatus having an optical system, comprising:
    a shake detector configured to detect a shake;
    an electro-optic element, including a KTN crystal, constituting a part of the optical system and configured to change a refractive-index distribution by an electro-optic effect in accordance with an applied voltage;
    a drive unit configured to apply a voltage to the electro-optic element so as to reduce an image blur caused by the shake detected by the shake detector; and
    an anti-shake unit configured separately from the electro-optic element to reduce the image blur detected by the shake detector.

2. An optical apparatus according to claim 1,
    wherein the drive unit drives the electro-optic element so as to reduce the image blur caused by a shake in a high-frequency as compared with the anti-shake unit provided separately from the electro-optic element.

3. An optical apparatus according to claim 1, further comprising a photosensitive member configured to record an object image formed by the optical system.

4. An optical apparatus according to claim 1,
    wherein the drive unit drives the electro-optic element so as to reduce an image blur caused by the shake in a frequency range higher than 100 Hz.

5. An optical apparatus according to claim 1,
    wherein the anti-shake unit shifts a lens.

6. An optical apparatus according to claim 1, wherein the anti-shake unit shifts an image pickup element.

7. An optical apparatus according to claim 1, wherein the electro-optic element generates a concentric refractive-index distribution inside the electro-optic element.

\* \* \* \* \*